March 31, 1970     W. DIRKS     3,503,364
MOTOR VEHICLE ACCELERATION RESPONSIVE INDICATOR
Filed June 2, 1969
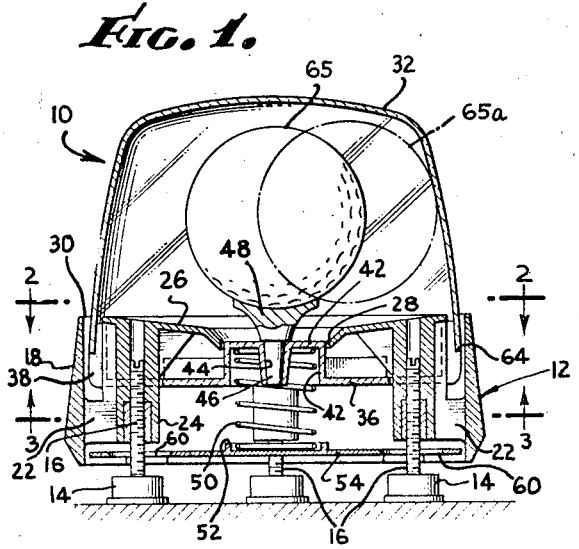
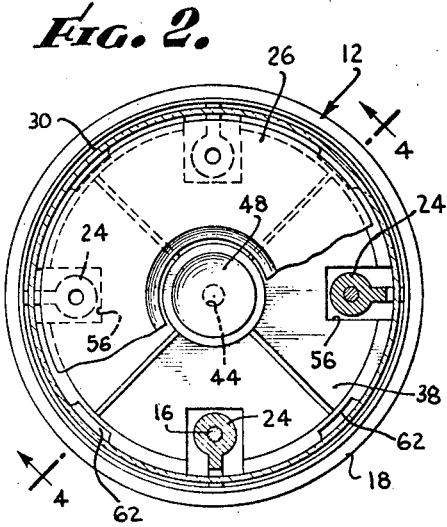
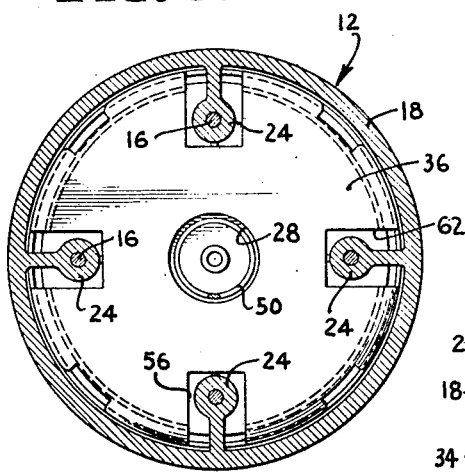
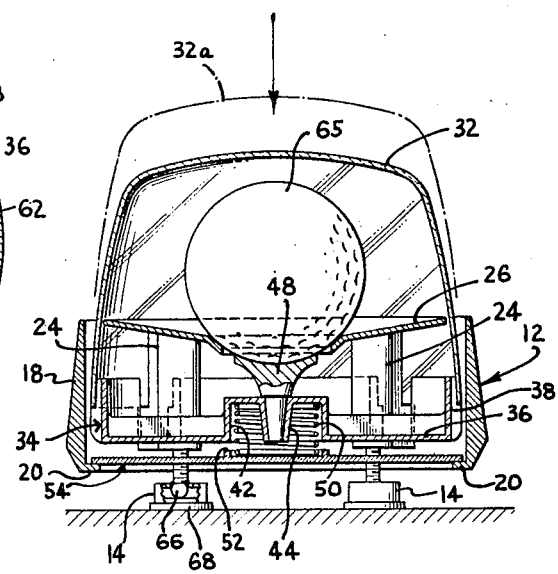
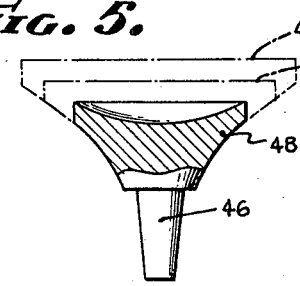
INVENTOR.
WILLIAM DIRKS
HIS ATTORNEY United States Patent Office 3,503,364
Patented Mar. 31, 1970

3,503,364
MOTOR VEHICLE ACCELERATION RESPONSIVE INDICATOR
William Dirks, San Francisco, Calif.
(3 Centerville Road, Box 165, Hannibal, Mo. 63401)
Filed June 2, 1969, Ser. No. 829,505
Int. Cl. G01p 15/00
U.S. Cl. 116—114
10 Claims

ABSTRACT OF THE DISCLOSURE

An acceleration responsive indicator is provided on the dashboard or other suitable shelf-like support of a motor vehicle, preferably in plain view of the operator, for recording a fault or demerit whenever the vehicle is started or stopped with objectionable abruptness, or rounds a curve too fast. When a fault occurs, a ball, contained within a hollow transparent dome, rolls off of a spring supported pedestal into the space between the pedestal and the dome. The ball may be replaced on the pedestal simply by depressing the dome, and thereby depressing the pedestal below the level of a fixed surface which surrounds the pedestal and slopes inward. When the cover is released, the pedestal, with the ball replaced on it, rises to its normal level.

---

Conservatism in the handling of a motor vehicle is unquestionably one of the most useful attributes of a driver, both from the standpoint of public safety, and from the standpoint of economical and dependable vehicle performance.

Although young people unquestionably have the best reflexes, and on the average have the best vision, they, and particularly the boys, are the worst drivers. On the average the optimum driving age has been found to be in the mid-forties, when judgment, experience, and conservatism have advanced more than reflexes and vision have deteriorated. If the lesson of conservatism could be drilled into the jack-rabbit drivers (and all of them are not young) the most serious road hazard would be largely eliminated. The conservative driver is in a position to be a good defensive driver.

This invention relates to an indicator device which, when properly installed upon the dashboard, or on any level or moderately sloping surface of a motor vehicle, in clear view of the driver, will measure and record the skill of the driver, particularly in relation to the conservatism of the driver in his handling of the vehicle.

It is a primary object of the invention to provide an instrument of the kind referred to which can be readily understood by anyone, is of economical construction, easy to assemble, dependable and consistent in operation, and attractive in appearance.

It is a more specific object of the invention to provide an indicator instrument of the kind referred to which includes a ball supported on a pedestal within a transparent dome, and adapted to roll off the pedestal whenever the acceleration of the vehicle (positive or negative) exceeds a chosen limit, but capable of being replaced on the pedestal by a momentary depression of the dome.

It is also an object to provide an instrument of the kind referred to which can be installed on a supporting surface without resort to the use of tools, and can be quickly leveled merely with the aid of a screw driver.

It is a further object to provide an instrument of the kind referred to which can be assembled manually, without resort to the use of tools, except for the installation of the leveling screws which may require either the use of a screw driver or of a pair of narrow-nosed pliers.

The indicator is very useful in driver education programs. It is a desirable adjunct of a family car to provide for each member of the family an opportunity for self-appraisal by reference to an impersonal and impartial judge, and as a constant but gentle remainder of the necessity of staying within certain limits.

It should be installed on very truck and bus, with stricter limits imposed as the weight of the truck or bus and the potential cargo go up.

Other objects and advantages will hereinafter appear.

In the drawing forming part of this specification:

FIGURE 1 is a view in sectional elevation showing a now preferred, practical and advantageous embodiment of the invention;

FIGURE 2 is a view of the indicator with parts broken away, the view being taken on the line 2—2 of FIGURE 1, looking in the direction of the arrows;

FIGURE 3 is a sectional view of the indicator taken on the line 3—3 of FIGURE 1, looking in the direction of the arrows;

FIGURE 4 is a view of the indicator taken on the line 4—4 of FIGURE 2, looking in the direction of the arrows, one foot of the indicator being partially broken away to reveal structure normally hidden within the foot;

FIGURE 5 is an enlarged view of the pedestal only, showing possible variations in pedestal size, with consequent variations in stability of ball support; and FIGURE 6 is a fragmentary bottom plan view of the indicator.

The novel indicator 10 illustratively shown in FIG-URES 1 to 4 and 6, comprises a rigid molded body member 12, desirably of a suitable plastic such as hard rubber, which is supported from feet 14 through leveling screws 16. The body 12 is of hollow construction, comprising a hollow circular outer portion 18 of substantial height which includes at its lower boundary a series of inwardly directed abutment lugs or fingers 20 (four as shown).

Brackets which form integral parts of the body comprise lower, inwardly extending arms 22, and inner, upwardly extending arms 24, the latter arms being hollow and internally threaded, so that the leveling screws 16 can be screwed into them to any depths desired. The upper ends of the arms 24 are integral with, and support, an inner unbroken body portion 26, which slopes downward toward the center, and is formed with a central opening 28. The arms 24 are spaced inward from the outer body portion 18, as is the inner portion 26, an uninterrupted annular space 30 of substantial depth, accessible from above, being provided just within the upper part of the outer body portion 18, for the reception of the lower rim of a transparent, hollow dome 32, the hollow dome being at all times freely removable from the body member.

A pressure plate 34, insertable into the body member 12 through the open lower end thereof prior to the application of the feet through the leveling screws, includes a solid transverse circular part 36, and an upstanding circumferential flange 38. The circular part 36 normally bears yieldingly upward against the lower face of the inner portion 26 of the body member and has an upstanding hollow boss 42 at its center which extends freely upward through the central opening 28 of the body portion 26 in the normal position of the pressure plate.

The boss 42 is formed at its center with a downwardly extending, tapering sleeve portion 44 in which the tapering stem 46 of a pedestal 48 may be inserted from above and may be snugly and stably supported.

Within the boss 42 and around the sleeve 44 an annular space is defined which is adapted to receive, and to maintain in place, the upper end of a compression coil spring 50. The lower end of the spring 50 is confined within an upstanding circular flange 52, formed on the upper surface of a circular reaction plate 54, the flange being concentric with the plate.

The reaction plate 54 is formed circumferentially with four notches 56 for enabling the plate to be inserted past the abutment lugs 20 and then reoriented so that the lugs support the reaction plate against withdrawal. The plate has four pairs of small bosses 58 formed on its lower face so spaced that each pair may engage opposite edges of one of the abutment lugs 20. Since the spring 50 which presses upward against the pressure plate 34 presses downward with equal force against the reaction plate 54, the bosses 58 serve effectively to maintain a desired orientation of the reaction plate. Four circular openings 60, formed in the reaction plate, are, by this orientation, aligned substantially concentrically with the upstanding bracket arms 24 of the body member, so that the leveling screws 16 can extend upward in coaxial relation to the openings 60.

Of necessity, the margin of the circular part 26 of the pressure plate 34, together with the flange 38, is cut away to form clearance notches 62 for avoiding interference with the body arms 24. The remaining segments of the flange 38 extend into the annular space between the inner and outer portions 26 and 18 of the body member and into close proximity to the outer body portion, except where they are thinned to clear the lugs 20. These segments are formed with upwardly facing shoulders 64, upon which the lower edge of the dome 32 is evenly supported.

After the body 12, the pressure plate 34, the spring 50 and the reaction plate 54 have been assembled in the relationship shown and described, the leveling screws 16 are threaded into the arms 24. When applying the device to a dashboard or other support, the leveling screws 16 are first adjusted, if necessary, to produce roughly the screw relationship required for mounting the indicator 10 on the chosen support in an approximately level condition. The device is then adhesively secured in place through the feet 14, and the leveling screws 16 are further adjusted, if necessary, for leveling the device. The screws have screw driver slots (see FIGURE 1) in their upper ends for this purpose. The pedestal 48 is then put into place, a tell-tale ball 65, desirably about the size of a golf ball (or an actual soft, light, practice golf ball) is placed on the pedestal, and the dome 32 is put in place.

In order for the leveling screws 16 to be made effective without straining the connection of the feet 14 with the dashboard, it is necessary for each leveling screw to be tiltable relative to the associated foot. Each leveling screw, therefore, has at its lower end a spherical head 66 which is confined within a hollow portion of the foot, the screw shank extending out of the foot through a hole in the upper side of the foot which is somewhat larger than the screw shank, but smaller than the screw head. A cover plate 68 closes the lower side of the foot to confine the screw head. The cover plate 68 has a coating of adhesive applied to its outer face, for adhesion to the dashboard. A protective cover strip (not shown), treated with a release agent, is peeled off of the adhesive coated face of the foot, in preparation for the adhesive attachment of the foot to the dashboard.

FIGURE 5 is designed to illustrate the fact that pedestals of varying sensitivities may be selectively employed. As will be seen, a pedestal 48 having a head of relatively small diameter is shown in full lines, while pedestals 48a and 48b, having heads of larger diameters, are indicated in broken lines. Each head has only line contact with the ball through the circular upper edge of the head. The larger the head, therefore, the more stable the ball support will be, and the greater will be the acceleration required to dislodge the ball from the pedestal. The stems of the pedestals are all of identical shape and size.

I have described what I believe to be the best embodiment of my invention,

I claim:
1. A motor vehicle acceleration responsive indicator for recording driving faults comprising, in combination,
   (a) a body adapted for mounting on the dashboard or other shelf-like support of the vehicle, and having an outer circular portion and an inner circular portion, the latter divided from the outer body portion by a narrow annular space, and having an opening formed at its center,
   (b) a hollow transparent dome,
   (c) a ball within the dome,
   (d) a pedestal normally supporting the ball above the surface of the inner body portion, with freedom to fall off into the space between the pedestal and the dome, and
   (e) spring means supporting the pedestal at its normal level, including a pressure plate which also supports the dome,
the construction and arrangement being such that the dislodged ball may be returned to the pedestal by depressing the dome and thereby depressing the pedestal to a level below that of the upper surface of the inner portion of the body.

2. A motor vehicle acceleration responsive indicator as set forth in claim 1 in which the inner circular portion of the body slopes downward toward the central opening thereof.

3. A motor vehicle acceleration responsive indicator as set forth in claim 1 in which an uninterrupted annular space of substantial depth is provided between the outer portion of the body and the inwardly sloping inner portion thereof, for reception of the lower margin of the glass dome, and the pedestal supporting pressure plate extends marginally into said annular space for balanced engagement with the lower boundary of the dome.

4. A motor vehicle acceleration responsive indicator as set forth in claim 3 in which the body is formed with inturned abutment fingers at its lower extremity, a spring reaction plate is provided and rests marginally upon said fingers, and the spring means includes a compression coil spring disposed centrally between the reaction plate and the pressure plate.

5. A motor vehicle acceleration responsive indicator as set forth in claim 4 in which the pedestal has a stem, and in which the pedestal supporting plate has a raised central hollow boss which is normally located within the central opening of the inner portion of the body, the boss having a central opening and an aligned downwardly extending sleeve for the reception of the pedestal stem, and the lower side of the boss, between said sleeve and the peripheral portion of the boss, defining a locating and retaining seat for the upper end of the spring.

6. A motor vehicle acceleration responsive indicator as set forth in claim 4 in which both the pressure plate and the spring reaction plate are formed with marginal notches for clearing the abutment fingers of the body when inserted into the body through the open end thereof, said notches of the pedestal supporting pressure plate interrupting the dome supporting margin thereof, and said reaction plate being rotatable within the body after it has passed inward beyond the abutment fingers and being formed with finger embracing bosses on its lower face which are spring-urged into position to maintain a desired orientation of the reaction plate.

7. A motor vehicle acceleration responsive indicator as set forth in claim 6 in which the outer and inner portions of the body are connected through brackets having lower inwardly extending portions and inner vertically extending portions, the latter portions being hollow and internally threaded, and which further includes leveling screws threaded into said bores and equipped at their lower ends with broad-based feet attached to the dashboard.

8. A motor vehicle acceleration responsive indicator as set forth in claim 7 in which each foot is connected to the associated screw with capacity for limited universal tilting, 9. A motor vehicle acceleration responsive indicator as set forth in claim 7 in which the reaction plate is formed with openings which are so located as to be aligned with the vertically extending portions of the body brackets by the reorientation of the reaction plate which follows its insertion into the body.

10. A motor vehicle acceleration responsive indicator, as set forth in claim 1 in which the dome is supported on the pressure plate in a freely removable manner, whereby access may be had to the pedestal and to the leveling screws, and the pedestal is supported by the pressure plate in a freely removable manner, so that it can be replaced at will by other pedestals of varying predetermined degrees of ball supporting stability.

References Cited

UNITED STATES PATENTS

| | | |
|---|---|---|
| 2,017,274 | 10/1935 | Breitenstein _____ 200—52 |
| 2,056,494 | 10/1936 | Tucker et al. _____ 200—52 |
| 2,144,002 | 1/1939 | Wallace et al. |
| 2,468,567 | 4/1949 | McBride _____ 273—109 |
| 2,557,654 | 6/1951 | Hagner. |
| 2,696,985 | 12/1954 | Hogeberg _____ 273—201 |
| 2,888,530 | 5/1959 | Horton _____ 73—492 XR |
| 3,025,064 | 3/1962 | Flood. |

LOUIS J. CAPOZI, Primary Examiner

U.S. Cl. X.R.

73—492